(12) United States Patent
Ling et al.

(10) Patent No.: US 10,581,585 B2
(45) Date of Patent: *Mar. 3, 2020

(54) METHOD AND SYSTEM FOR CROSS-PROTOCOL TIME SYNCHRONIZATION

(71) Applicant: Maxlinear, Inc., Carlsbad, CA (US)

(72) Inventors: Curtis Ling, Caelsbad, CA (US); Timothy Gallagher, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 666 days.

This patent is subject to a terminal disclaimer.

(21) Appl. No.: 14/457,100

(22) Filed: Aug. 11, 2014

(65) Prior Publication Data

US 2014/0348185 A1 Nov. 27, 2014
US 2020/0007307 A9 Jan. 2, 2020

Related U.S. Application Data

(63) Continuation of application No. 12/980,202, filed on Dec. 28, 2010, now Pat. No. 8,497,802.

(Continued)

(51) Int. Cl.
*G01S 19/05* (2010.01)
*G01S 19/24* (2010.01)
(Continued)

(52) U.S. Cl.
CPC ............ *H04L 7/0079* (2013.01); *G01S 19/05* (2013.01); *G01S 19/246* (2013.01); *H04B 1/707* (2013.01); *G01S 19/235* (2013.01)

(58) Field of Classification Search
CPC ...... G01S 19/05; G01S 19/235; G01S 19/246; H04B 1/707; H04L 7/0079
(Continued)

(56) References Cited

U.S. PATENT DOCUMENTS 7,292,188 B2 11/2007 Rowitch
7,693,130 B2 4/2010 Barry et al.
(Continued)

FOREIGN PATENT DOCUMENTS

WO 2006015290 2/2006

OTHER PUBLICATIONS

International Preliminary Report on Patentability for Application No. PCT/US2010/062258 dated Jul. 12, 2012, 7 pages.
(Continued)

*Primary Examiner* — Raj Jain
(74) *Attorney, Agent, or Firm* — McAndrews, Held & Malloy

(57) ABSTRACT

Methods and systems for cross-protocol time synchronization may comprise, for example, in a premises-based network, receiving a signal that conforms to a data over cable service interface specification (DOCSIS) communications protocol. A global time of day (GTOD) clock may be extracted from the received signal. Communication on the premises-based network in accordance with a multimedia over cable alliance (MoCA) communications protocol may be synchronized based at least in part on the extracted GTOD clock. Communication in a third communications protocol may be synchronized, wherein the third communications protocol may include a home phoneline networking alliance (HPNA) standard, an IEEE 802.11x standard, and a non-public wireless network protocol. The extracted GTOD clock may comprise a GPS clock, GLONASS clock, and a Galileo clock. A second signal for extracting a GTOD may be received, such as a satellite signal, and may conform to a low Earth orbit satellite signal protocol.

20 Claims, 5 Drawing Sheets

Related U.S. Application Data

(60) Provisional application No. 61/290,449, filed on Dec. 28, 2009.

(51) Int. Cl.
  *G01S 19/23* (2010.01)
  *H04L 7/00* (2006.01)
  *H04B 1/707* (2011.01)

(58) Field of Classification Search
  USPC .......................................................... 370/503
  See application file for complete search history.

(56) References Cited

U.S. PATENT DOCUMENTS

| | | | |
|---|---|---|---|
| 8,233,432 B2 | 7/2012 | Northcutt et al. | |
| 8,400,911 B2* | 3/2013 | Smith | H04L 69/28 370/225 |
| 2002/0033416 A1* | 3/2002 | Gerszberg | H04M 19/001 235/380 |
| 2004/0146093 A1 | 7/2004 | Olson et al. | |
| 2006/0026017 A1* | 2/2006 | Walker | G06Q 10/00 701/31.4 |
| 2006/0071855 A1* | 4/2006 | Rowitch | H04W 64/00 342/464 |
| 2006/0161675 A1* | 7/2006 | Ducharme | H04N 21/23406 709/231 |
| 2007/0171125 A1 | 7/2007 | Abraham et al. | |
| 2007/0285308 A1* | 12/2007 | Bauregger | G01S 19/10 342/357.27 |
| 2008/0120667 A1* | 5/2008 | Zaltsman | H04L 12/2856 725/110 |
| 2008/0159744 A1* | 7/2008 | Soto | H04M 19/08 398/115 |
| 2008/0209489 A1* | 8/2008 | Joyce | H04L 12/2801 725/111 |
| 2008/0247334 A1* | 10/2008 | Lee | H04L 12/2807 370/255 |
| 2009/0054075 A1* | 2/2009 | Boejer | G01S 19/09 455/456.1 |
| 2009/0092152 A1* | 4/2009 | Rajakarunanayake | H04L 1/0009 370/473 |
| 2009/0092154 A1* | 4/2009 | Malik | H04L 12/2856 370/480 |
| 2009/0207865 A1* | 8/2009 | Yonge, III | H04B 3/54 370/503 |
| 2009/0231191 A1* | 9/2009 | Wu | G04G 7/00 342/357.395 |
| 2009/0233622 A1 | 9/2009 | Johnson | |
| 2009/0248828 A1* | 10/2009 | Gould | G08B 27/005 709/207 |
| 2009/0315768 A1 | 12/2009 | Abraham | |
| 2010/0031297 A1* | 2/2010 | Klein | H04L 12/12 725/78 |
| 2010/0069035 A1 | 3/2010 | Johnson | |
| 2010/0071053 A1* | 3/2010 | Ansari | G06Q 30/04 726/12 |
| 2010/0098110 A1* | 4/2010 | Mueller | H04J 3/0664 370/503 |
| 2010/0186027 A1* | 7/2010 | Hou | H04N 7/173 725/31 |
| 2010/0220692 A1* | 9/2010 | Diab | H04J 3/0641 370/336 |
| 2010/0245568 A1 | 9/2010 | Wike et al. | |
| 2011/0093900 A1* | 4/2011 | Patel | H04N 7/17318 725/54 |
| 2011/0107404 A1* | 5/2011 | Ramsdell | H04L 12/14 726/5 |
| 2011/0150160 A1* | 6/2011 | Laudel | H04L 7/041 375/362 |
| 2014/0109132 A1* | 4/2014 | Hasek | H04N 7/17318 725/32 |
| 2014/0348185 A1* | 11/2014 | Ling | G01S 19/05 370/503 |

OTHER PUBLICATIONS

International Search Report and Written Opinion corresponding to the PCT application No. PCT/US2010/062258, dated Mar. 21, 2011, 9 pages total.

* cited by examiner

METHOD AND SYSTEM FOR CROSS-PROTOCOL TIME SYNCHRONIZATION

CROSS-REFERENCE TO RELATED APPLICATIONS/INCORPORATION BY REFERENCE

This application is a continuation of Application Ser. No. 13/305,921 filed on Nov. 29, 2011, which is incorporated herein by reference in its entirety. This application also makes reference to:
U.S. Provisional Patent Application Ser. No. 61/290,449 filed on Dec. 28, 2009; and
U.S. patent application Ser. No. 12/980,202 filed on Dec. 28, 2010.

Each of the above stated applications is hereby incorporated herein by reference in its entirety.

FIELD OF THE INVENTION

Certain embodiments of the invention relate to communication network synchronization. More specifically, certain embodiments of the invention relate to a method and system for cross-protocol time synchronization (e.g., in a premises-based communication network).

BACKGROUND OF THE INVENTION

Although computer networks have been in existence for decades, they only recently became commonplace in homes. Wired networks over various types of wire and cable as well as wireless networks over consumer wireless routers have been developed for use in residential applications.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing cross-protocol time synchronization, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for cross-protocol time synchronization. Exemplary aspects of the invention may comprise, in a multi-protocol premises-based network, receiving a signal that conforms to a first communications protocol, extracting a global time of day (GTOD) clock (which, for example includes data and/or any signal characteristic(s) representative of the GTOD clock) from the received signal; and synchronizing clocks of networked devices that communicate signals that conform to the first communications protocol and signals that conform to a second communications protocol. The first communications protocol may comprise data over cable service interface specification (DOCSIS) and/or any protocol that provides a GTOD. The second communication protocol may comprise a multimedia over cable alliance (MoCA) standard, an IEEE 802.11x standard, or any non-public wireless network protocol. The GTOD clock may comprise a GPS clock, a GLONASS clock, or a Galileo clock. One or more of the networked devices may comprise a network controller, where the network controller comprises wireless network and wired network capability.

Figure 1:
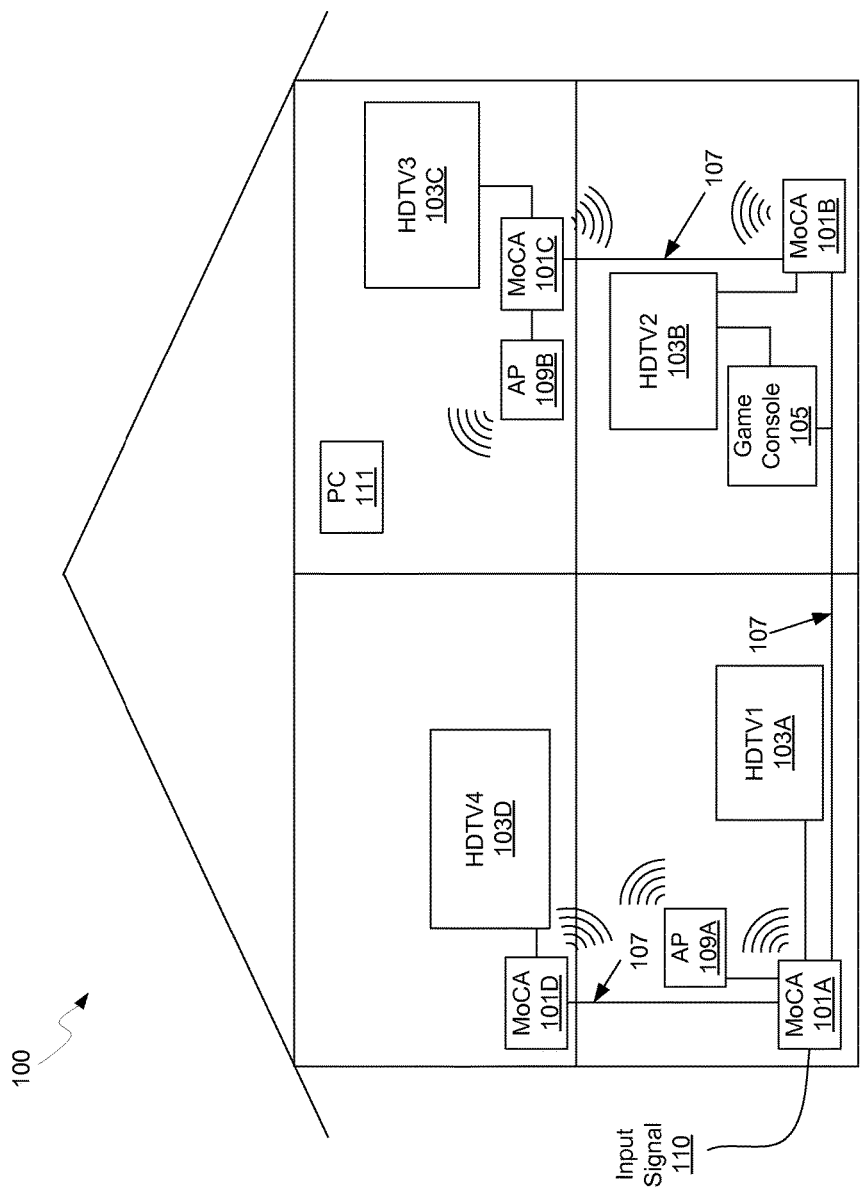
FIG. 1 is a diagram illustrating exemplary dwelling-based networks, in accordance with an embodiment of the invention.

FIG. 1 is a diagram illustrating exemplary dwelling-based networks, in accordance with an embodiment of the invention. Referring to FIG. 1, there is shown a dwelling-based wired and wireless network 100 spanning a plurality of rooms in the dwelling, where each one may have one or more networked devices. There is also shown Multimedia over Cable Alliance (MoCA) bridges 101A-101D, high-definition televisions (HDTVs) 103A-103D, a game console 105, wireless access points 109A and 109B, a personal computer 111, coaxial cables 107, and an input signal 110, which may be provided by a cable head-end or a satellite signal source, for example.

The MoCA bridges 101A-101D (or general MoCA devices) may comprise network bridges that enable a secure wired network utilizing the coaxial cables 107 in the dwelling wired and wireless network 100. The MoCA bridges 101A-101D may, for example, be stand-alone apparatus or may be incorporated in other devices (e.g., televisions, PVR, STBs, PCs, network attached storage (NAS) devices, etc.). The MoCA bridges 101A-101D may operate under the MoCA 1.x or 2.x specification, for example, and may communicate signals between bridges in a 1-2 GHz frequency range. Other communication protocols may be utilized on the same coaxial cables 107. One or more of the MoCA bridges 101A-101D may comprise a network controller in the wired network, coordinating the wired network communications as per the MoCA standard. For example, a first of the MoCA bridges 101A-101D may operate as the MoCA network controller, while a second operates as a back-up network controller.

In another exemplary embodiment, one or more of the MoCA bridges 101A-101D may be operable to provide a WLAN network without the need for an access point, such as the access points 109A and 109B.

Cable television signals, including data over cable service interface specification (DOCSIS) signals, may be communicated in the 50 MHz to 1 GHz range, for example. The cable range generally has about 150 6-MHz TV channels, some of which are allocated to DOCSIS, some to digital television, and some to analog television. DOCSIS may, for example, be used to provide Internet access to the cable subscriber. DOCSIS signals may provide accurate global navigation satellite system (GNSS), e.g., GPS, GLONASS, or Galileo, timing, because in hybrid fiber-coax (HFC) networks the upstream transmissions are synchronized down to tens of nanoseconds since the subscribers share the cable/fiber. Thus, as part of the DOCSIS specification, GPS timing is available.

In an exemplary scenario, the GPS-precise timing available from DOCSIS may be transferred to MoCA, and then to other devices connected to MoCA such as WiFi devices, home phoneline networking alliance (HPNA) devices, etc. This may enable the correction of time delays between gateway and client because of the accurate knowledge of the MoCA channel. This may also enable relatively more accurate MoCA channel estimation to be performed, enhancing the overall performance of the MoCA network in comparison with utilizing the relatively imprecise timing mechanisms native to the MoCA standard.

The access point 109 may be operable to provide wireless network access to devices within the dwelling-based wired and wireless network 100. Exemplary wireless networks may comprise wireless local area networks (WLANs) that conform to an IEEE 802.11 (e.g., a, b, g, n, and ac) protocol, femtocells, Bluetooth, ZigBee networks, or any other non-public networks. The access point 109A may be coupled to the MoCA bridge 101A via a wired connection, such as a coaxial cable or an Ethernet cable, for example. In another exemplary embodiment, the MoCA bridges 101A-101D themselves may comprise such wireless capability, including, but not limited to an IEEE 802.11 (e.g., a, b, g, n, and ac) protocol, femtocells, Bluetooth, ZigBee networks, or any other non-public networks.

Under the MoCA standard, orthogonal frequency-division multiple access (OFDMA) enables multiple nodes to simultaneously transmit PHY-frames, each utilizing only a subset of subcarriers. The network controller pre-allocates the OFDMA subcarrier subset to nodes on a mutually exclusive basis, with each OFDMA PHY frame containing reservation requests destined solely for the network controller. The requesting nodes are to synchronize their subcarriers to those of the network controller, adjust their transmissions to ensure simultaneous time-of-arrival at the network controller, and adjust the amplitude of their transmissions as specified by the network controller. If these elements are met, the network controller receives a PHY frame with a payload bitstream that is demultiplexed to recover and forward-error-correction (FEC)-decode each individually transmitted reservation request.

The transfer of an accurate GPS clock from DOCSIS to MoCA, and then to other network protocols utilized in the dwelling-based wired and wireless network 100 may be utilized for indoor positioning, for example. In MoCA, the length of the cables may be determined via probing, so the accurate time may be transferred from the cable network to any of the devices that are coupled via MoCA, and also to wireless networked devices. This may enable indoor positioning (e.g., triangulation) down to a foot of resolution, or finer, where integration time may be greatly extended for more accuracy. Additionally, this accuracy in determining location may be utilized to enhance any system that uses positioning, such as gaming, home asset tracking, security, etc. Similarly, in a femtocells network, the improved accuracy timing may be utilized for positioning or for more efficient utilization of guard intervals allocated for clock drift.

In another exemplary scenario, the accurate GPS timing transferred to MoCA may, for example, be tied to conditional access. In this manner, the service provider or subscriber system may know where the authorized conditional access devices are located, and deny access to devices where not authorized.

In a multi-pathway example, in a multimedia communication (e.g., an audio/video communication and bandwidth reservation requests), a first media (e.g., the audio/video component) may be communicated via a cable medium, and a second media (e.g., reservation requests) may be communicated via a wireless medium. In a further multipath example, in a communication involving the communication of general data information and control information, the general data information may be communicated via a cable medium, and the control information, such as reservation requests, may be communicated via a wireless medium. Note that in such multi-pathway communication may also include the communication of redundant information via each pathway (e.g., critical information may be communicated over both the wired medium and over the wireless medium).

While FIG. 1 shows MoCA, DOCSIS, and WLAN communications protocols, any network protocol may be applicable, where the network bridge has the capability to communicate via two or more communications protocols. The ability of the network devices to communicate using two or more protocols enables the exportation of an accurate clock signal from one protocol to another. For example, an accurate clock may be extracted from a low-earth orbit satellite signal (e.g., Iridium) and exported into a MoCA or other network protocol in the dwelling wired and wireless network 100.

In another exemplary scenario, a plurality of GTOD clocks may be extracted from, for example, DOCSIS, GPS, FiOS, and low Earth orbit satellite signals received at the MoCA nodes 101A-101D or other networked devices. The plurality of GTOD clocks may then be aggregated and averaged, with individual weighting applied according to the trustworthiness of each received GTOD clock. For example, if a particular GTOD time source is occasionally excessively inaccurate due to, for example, the fact that it cannot be calibrated often enough, such GTOD time source may be weighted lower than a consistently accurate clock, such as from DOCSIS. Accordingly, a single synchronized and accurate clock may then be supplied for the dwelling-based wired and wireless network 100. Probe signals may be utilized to determine transmission delays for further accuracy in synchronization of various clocks.

Figure 2A:
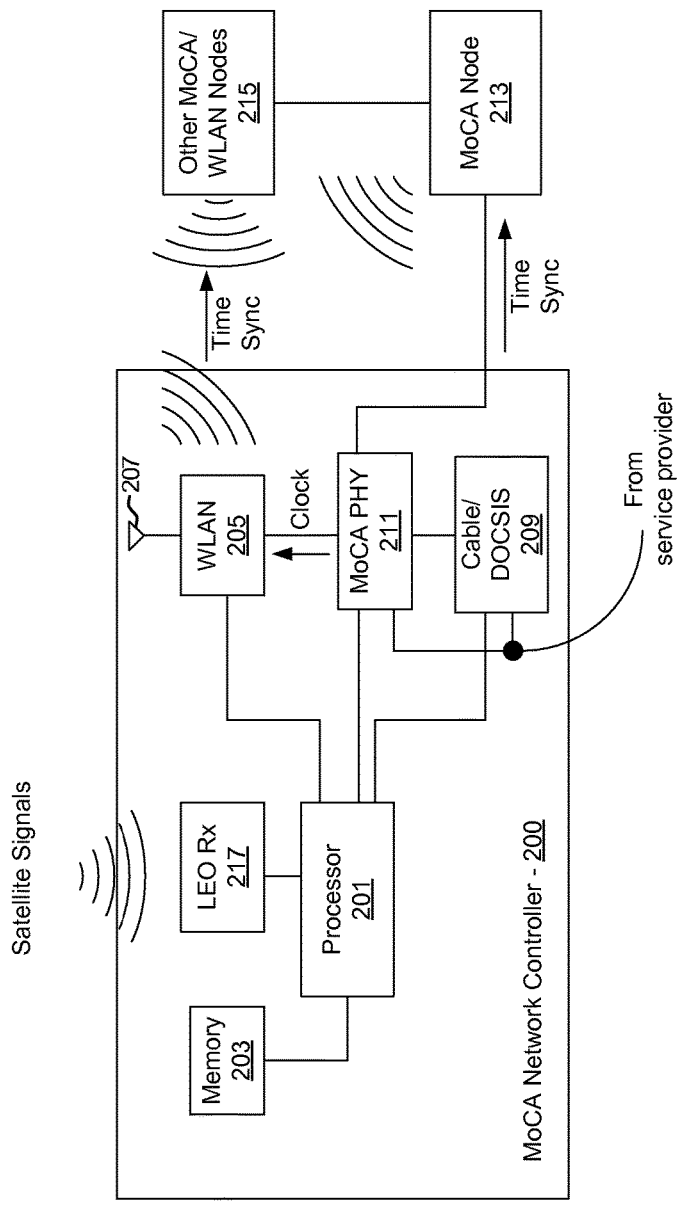
FIG. 2A is a diagram illustrating an exemplary network controller, in accordance with an embodiment of the invention.

FIG. 2A is a diagram illustrating an exemplary network controller 200, in accordance with an embodiment of the invention. Referring to FIG. 2A, there is shown a network controller 200 comprising a processor 201, a memory 203, a WLAN module 205, one or more WLAN antenna(s) 207, a cable/DOCSIS module 209, a MoCA PHY 211, a MoCA node 213, other MoCA/WLAN nodes 215, and a low Earth orbit (LEO) receive module (Rx) 217.

The processor 201 may be operable to control the operation of the MoCA network controller 200. For example, the processor 201 may configure the WLAN module 205 to communicate signals at a desired frequency or may configure MoCA channels to be utilized by the MoCA PHY 211. Furthermore, the processor 201 may control the synchronization of timing signals utilizing an extracted GPS clock (e.g., GTOD) from the cable/DOCSIS module 209 and sent to the MoCA node 213 and/or the other MoCA/WLAN nodes 215. In another embodiment of the invention, the processor 201 may be utilized to update and/or modify programmable parameters and/or values in a plurality of components, devices, and/or processing elements. The processor 201 may be operable to generate probe signals that may be communicated to various nodes and/or devices for determining transmission times to further improve clock accuracy and synchronization. At least a portion of the programmable parameters may be stored in the memory 203.

The WLAN module 205 may be operable to communicate wireless RF signals via the antenna(s) 207 thereby providing wireless network capability to the MoCA network controller 200. WLAN module 205 may be operable to down-convert received RF signals to baseband for processing by the processor 201, and may up-convert baseband signals received from the processor 201 for communication to devices utilizing the WLAN provided by the WLAN module 205.

The cable/DOCSIS module 209 may be operable to receive and process cable signals received from a service provider. Accordingly, DOCSIS signals may be received and transmitted by the cable/DOCSIS module 209, which may include an accurate GPS clock, GNSS time, DTI time, or GTOD. In another exemplary scenario, the capabilities of the cable/DOCSIS module 209 may be integrated into the MoCA PHY 211.

The MoCA PHY 211 may be operable to communicate signals over coaxial cables, such as the coaxial cables 107, where the signals conform to the MoCA 1.x and/or 2.x standards, to one or more remote MoCA nodes, such as the MoCA node 213. Accordingly, transmissions may be PHY frames scheduled in accordance with the Media Access Control (MAC) Layer specifications, and as such may comprise a PHY preamble and a PHY payload and may apply OFDM modulation. The MoCA network controller 200 may schedule and broadcast specific start and stop times at which transmissions from each node begin and end, and may be communicated in response to reservation requests. The MoCA PHY 211 may be operable to extract an accurate GPS clock from the signals received from the cable/DOCSIS module 209, and may in turn communicate this accurate GPS clock to other MoCA devices or WLAN devices, such as the MoCA node 213 and the other MoCA/WLAN nodes 215.

The extracted GPS clock may comprise a global time of day (GTOD), and may correspond to DOCSIS timing interface (DTI) time, for example, which may comprise any stable time base provided by a network that remains synchronous with GNSS time. This accurate time is hereinafter referred to as GTOD. In an exemplary scenario, the GTOD may correspond to Greenwich Mean Time (GMT) and may be accurate on the order of nanoseconds. This clock extraction may also result in a one pulse per second signal (1PPS).

The MoCA node 213 may comprise a generic MoCA device, such as a cable set top box, for example, that may be controlled by the MoCA network controller 200. The MoCA node 213 may be operable to request bandwidth for communication of data signals by sending reservation requests to the MoCA network controller 200. The MoCA node 213 may also have wireless capability for communication of data, and the accurate GPS timing. In another exemplary scenario, the MoCA node 213 may be substantially similar to the MoCA network controller 200 with similar capabilities of controlling networking functions of wired and wireless communications in the dwelling wired and wireless network 100. Accordingly, the MoCA node 213 may act as a backup network controller for the MoCA network controller 200.

The other MoCA/WLAN nodes 215 may comprise one or more other nodes or devices that utilize the wired and wireless networks in the dwelling wired and wireless network 100, and may comprise slave nodes that may be controlled by the MoCA network controller 200, and may also be capable of acting as a backup network controller. The controlling nodes may be operable to configure the communications channels used by all devices in the wired and wireless networks. The other MoCA/WLAN nodes 215 may also have wireless capability for data communication and clock synchronization.

The LEO Rx 217 may comprise RF receiver and demodulation circuitry for receiving and demodulating LEO satellite signals, thereby enabling the extraction of an accurate clock from MEO satellite signals.

In operation, the MoCA network controller 200 may direct network traffic to and from a particular device via a combination of the available network media, i.e. over both wired and wireless paths via the MoCA PHY 211 and the WLAN module 205. The MoCA network controller 200 may configure the communications links between all other network nodes within the dwelling wired and wireless network 100.

In an exemplary scenario, the MoCA network controller may extract an accurate GPS clock from DOCSIS channels received from a service provider. The GPS clock may be utilized to enhance synchronization for OFDMA in the MoCA network. For example, frequency offsets may be reduced down to fractions of a part per million (PPM) or parts per billion (PPB), to minimize co-channel interference. Conventional MoCA devices are not able to obtain such frequency offsets since they do not have a stable enough time base. Furthermore, since in MoCA devices, the length and phase response of every cable may be known, so that in conjunction with an accurate GPS clock, a MoCA device may then be able to accurately determine how much delay there is between each device in the network. In other words, this may enable the elimination of all frequency drift in anything that is hooked up to the MoCA/cable network.

In another exemplary scenario, the extraction of accurate timing from the DOCSIS signal for use in a MoCA network may be utilized to greatly reduce and/or eliminate MoCA protocol overhead associated with frequency synchronization. Accordingly, the DOCSIS timing may be utilized to align MoCA beacon frame edges to known timing intervals to permit frequency offset/clock drift gauging and correction. For example, even when the beacon frames are not transmitted exactly periodically, a beacon edge may be transmitted on a very precise quantum. Such edge precision might, for example, be combined with the gross timing information provided within a beacon to form a very precise indication of timing.

The MoCA network controller 200 may broadcast timing synchronization information. Under the MoCA standard protocol, there is no provision of a regular timing edge, at least with significant accuracy, i.e., there is only a very coarse timing. Each beacon frame contains a time stamp, but it is too coarse with which to calibrate the crystal, resulting in excessive jitter. The MoCA standard provides for measuring frequency offset at the packet level during link maintenance, but this is more of an instantaneous frequency offset measurement and not necessarily a longer term type of correction. This link maintenance may, for example, occur about every 30 seconds.

In an exemplary scenario, the MoCA network controller 200 may communicate a timing synchronization edge that may be utilized to sync the crystals at each of the MoCA clients (e.g., by maintaining offset information at each of such MoCA clients). The synchronization may be performed periodically, and may be utilized to minimize frequency offset for OFDMA. Furthermore, this synchronization may be utilized with non-MoCA devices, such as WLAN devices, for example.

While FIG. 2A shows MoCA, DOCSIS, and WLAN communications protocols, any network protocol may be applicable, where the MoCA network controller 200 has the capability to communicate via and/or knowledge of two or more communications protocols. The ability of the network devices to communicate using two or more protocols enables the exportation of an accurate clock signal from one protocol to another.

Additionally, in a scenario involving premises-based (e.g., home-based) communication networks, the total bandwidth utilized is generally within the control of premises-based devices. For example, communication via a MoCA network is controlled by home-based devices, and communication via a WLAN network is also controlled by home-based devices. Such an operational situation (unlike utilization of public networks) advantageously allows for enhanced optimization of communication bandwidth utilization (e.g., because adverse impacts of unpredictable public utilization of communication bandwidth are generally absent).

Figure 2B:
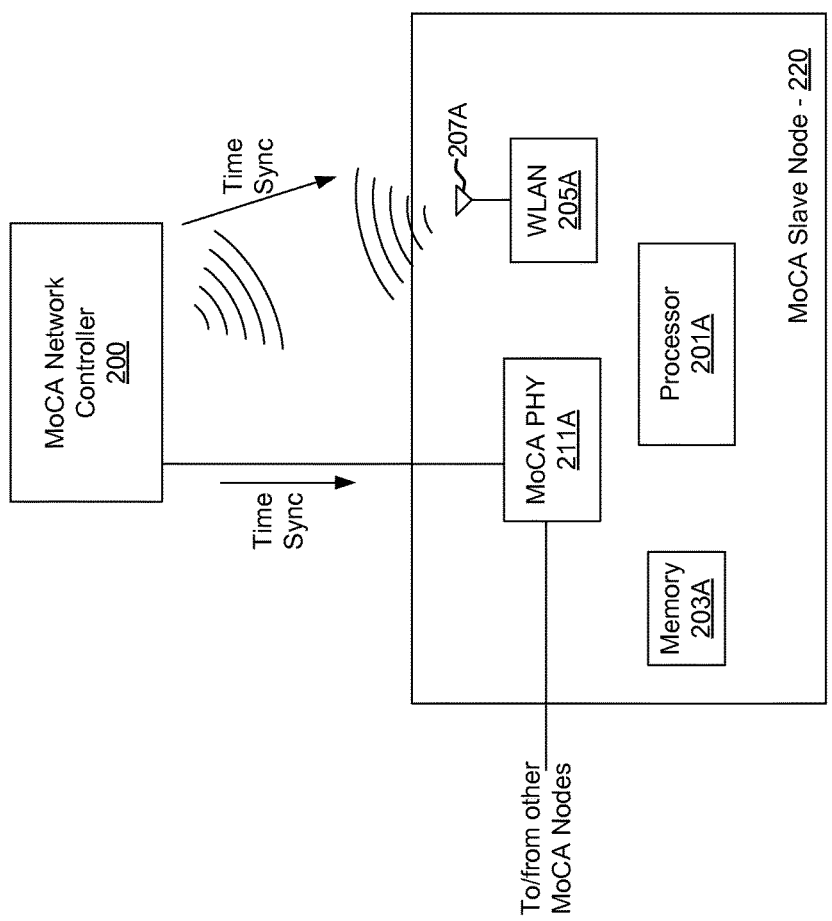
FIG. 2B is a diagram illustrating an exemplary network device, in accordance with an embodiment of the invention.

FIG. 2B is a diagram illustrating an exemplary network device, in accordance with an embodiment of the invention. Referring to FIG. 2B, there is shown the MoCA network controller 200 and a MoCA slave node 220 comprising a processor 201A, a memory 203A, a WLAN module 205A and a MoCA PHY 211A. The processor 201A, the memory 203A, the WLAN module 205A and the MoCA PHY 211A may be substantially similar to the processor 201, the memory 203, the WLAN module 205 and the MoCA PHY 211 described with respect to FIG. 2A, but located within the MoCA slave node 220.

The MoCA slave node 220 may, for example, share any or all characteristics with the MoCA Nodes 213 and 215 discussed previously with regard to FIG. 2A. Also, the MoCA network controller 200 may, for example, share any or all characteristics with the MoCA network controller 200 discussed previously with regard to FIG. 2B.

The MoCA slave node 220 may comprise a networked device such as a MoCA bridge, a set-top box, a personal computer, or a gaming device, and may be controlled (at least in part) by the MoCA network controller 200. For example, the MoCA network controller 200 may configure the timing of the MoCA slave node 220 by communicating an accurate time signal to the MoCA slave node 220 derived from a GPS clock from received DOCSIS signals. In another exemplary embodiment, the timing signal may be received from any device and/or protocol that comprises such an accurate clock as GPS, and is not limited to DOCSIS.

While FIG. 2B shows MoCA, DOCSIS, and WLAN communications protocols, any network protocol may be applicable, where the MoCA network controller 200 and the MoCA slave node 220 have the capability to communicate via and/or knowledge of two or more communications protocols. The ability of the network devices to communicate using two or more protocols enables the exportation of an accurate clock signal from one protocol to another.

Additionally, in a scenario involving premises-based (e.g., home-based) communication networks, the total bandwidth utilized is generally within the control of premises-based devices. For example, communication via a MoCA network is controlled by home-based devices, and communication via a WLAN network is also controlled by home-based devices. Such an operational situation (unlike utilization of public networks) advantageously allows for enhanced optimization of communication bandwidth utilization (e.g., because adverse impacts of unpredictable public utilization of communication bandwidth are generally absent).

Figure 3:
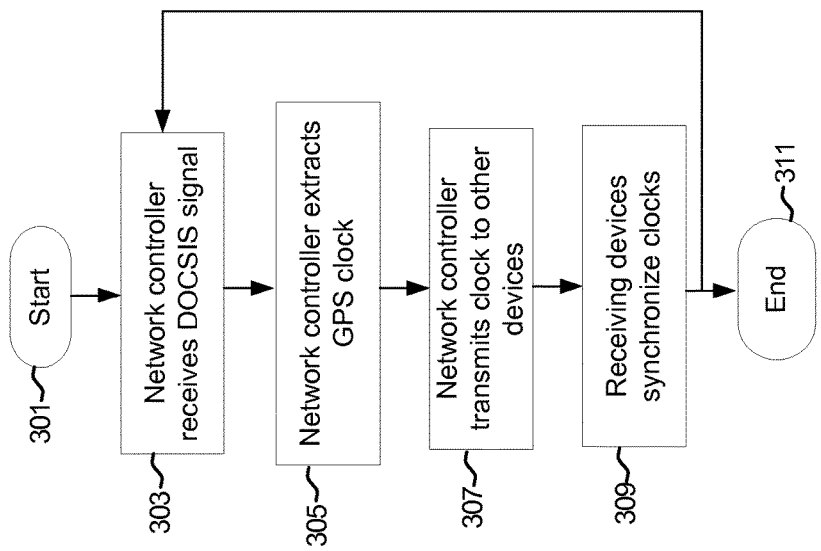
FIG. 3 is a block diagram illustrating exemplary steps in cross-protocol clock synchronization, in accordance with an embodiment of the invention.

FIG. 3 is a block diagram illustrating exemplary steps in cross-protocol clock synchronization, in accordance with an embodiment of the invention. The exemplary method illustrated in FIG. 3 may, for example, share any or all functional aspects discussed previously with regard to FIGS. 1, 2A, and 2B. Referring to FIG. 3, after start step 301, in step 303, the MoCA network controller 200 may receive DOCSIS signals comprising an accurate GPS clock signal. The MoCA network controller 200 may receive the GPS clock signal via a source other than a DOCSIS signal.

In step 305, the MoCA network controller 200 may extract the GPS clock signal. Step 305 may, for example and without limitation, share any or all functional aspects discussed previously (e.g., with regard to FIGS. 1, 2A, and 2B).

In step 307, the MoCA network controller 200 may transmit the clock signal, or an accurate timing edge, for example, to other devices networked with the MoCA network controller 200.

In step 309, the receiving devices may synchronize their clocks based on the received clock signal or timing edge, followed by end step, or the process may loop back to step 303 if further communications are to occur.

Figure 4:
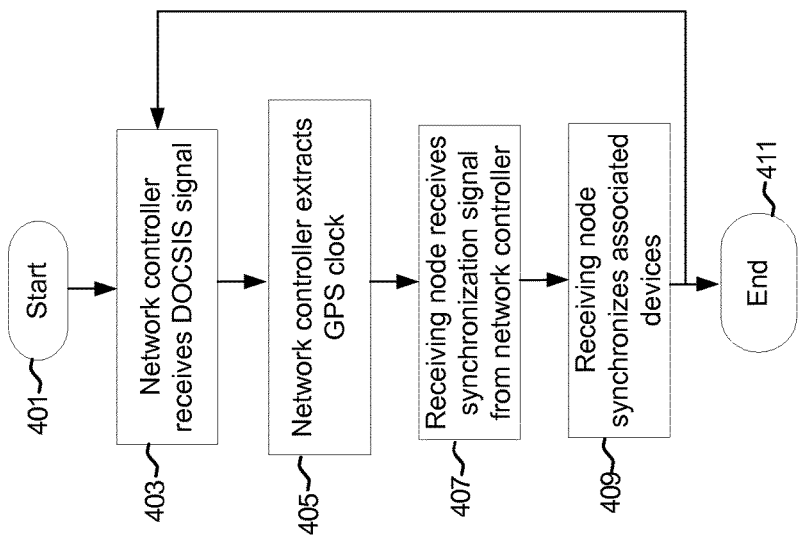
FIG. 4 is a block diagram illustrating exemplary steps in cross-protocol clock synchronization, in accordance with an embodiment of the invention.

FIG. 4 is a block diagram illustrating exemplary steps in cross-protocol clock synchronization, in accordance with an embodiment of the invention. The exemplary method illustrated in FIG. 4 may, for example, share any or all functional aspects discussed previously with regard to FIGS. 1-3. Referring to FIG. 4, after start step 401, in step 403, MoCA network controller 200 may receive DOCSIS signals comprising an accurate GPS clock signal. Alternatively, the MoCA network controller 200 may receive the GPS clock signal via a source other than a DOCSIS signal.

In step 405, the MoCA network controller 200 may extract the GPS clock signal. Step 405 may, for example and without limitation, share any or all functional aspects discussed previously (e.g., with regard to FIGS. 1-3).

In step 407, the receiving node, the MoCA slave node 220 may receive the synchronization signal from the MoCA network controller 200. The synchronization signal may comprise a GPS clock signal or an accurate timing edge, for example.

In step 409, the MoCA slave node 220 may relay the synchronization signal to other devices coupled to the MoCA slave node 220, such as a set-top box or HDTV, for example, followed by end step, or the process may loop back to step 403 if further communications are to occur.

In an embodiment of the invention, a method and system may comprise, in a multi-protocol premises-based network, receiving a signal that conforms to a first communications protocol, extracting a global time of day (GTOD) clock from the received signal; and synchronizing clocks of networked devices 200, 213, 215, 220 that communicate signals that conform to the first communications protocol and signals that conform to a second communications protocol.

The first communications protocol may comprise data over cable service interface specification (DOCSIS). The second communication protocol may comprise a multimedia over cable alliance (MoCA) standard, an IEEE 802.11x standard, or any non-public wireless network protocol. The GTOD clock may comprise a GPS clock, a GLONASS clock, or a Galileo clock. One or more of the networked devices may comprise a network controller 200, where the network controller 200 comprises wireless network and wired network capability.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for cross-protocol time synchronization.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system may primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising: in a premises-based network:
receiving a signal that conforms to a data over cable service interface specification (DOCSIS) communications protocol;
extracting a global time of day (GTOD) clock from said received signal; and
synchronizing communication on the premises-based network in accordance with a multimedia over cable alliance (MoCA) communications protocol by synchronizing orthogonal frequency division multiple access (OFDMA) channel frequency offsets to less than a part per million, based at least in part on said extracted GTOD clock.

2. The method according to claim 1, comprising synchronizing communication in a third communications protocol in the premises-based network, wherein the third communications protocol comprises a home phoneline networking alliance (HPNA) standard.

3. The method according to claim 1, comprising synchronizing communication in a third communications protocol in the premises-based network, wherein the third communications protocol comprises an IEEE 802.11x standard.

4. The method according to claim 1, comprising synchronizing communication in a third communications protocol in the premises-based network, wherein the third communications protocol comprises a non-public wireless network protocol.

5. The method according to claim 1, wherein said extracted GTOD clock comprises one or more of: a GPS clock, GLONASS clock, and a Galileo clock.

6. The method according to claim 1, comprising receiving a second signal for extracting a GTOD, wherein the second signal is a satellite signal.

7. The method according to claim 6, wherein said satellite signal conforms to a low Earth orbit satellite signal protocol.

8. The method according to claim 1, comprising receiving a second signal for extracting a GTOD, wherein the second signal conforms to any protocol that provides a GTOD.

9. The method according to claim 1, wherein said synchronizing comprises synchronizing timing of signals transmitted by a network controller of the premises-based network, based at least in part on said extracted GTOD clock.

10. The method according to claim 9, wherein said network controller comprises wireless network and wired network capability.

11. A system for communication, the system comprising: one or more circuits for use in a premises-based network, said one or more circuits being operable to:
receive a signal that conforms to a data over cable service interface specification (DOCSIS) communications protocol;
extract a global time of day (GTOD) clock from said received signal; and
synchronize communication on the premises-based network in accordance with a multimedia over cable alliance (MoCA) communications protocol by synchronizing orthogonal frequency division multiple access (OFDMA) channel frequency offsets to less than a part per million, based at least in part on the extracted GTOD clock.

12. The system according to claim 11, wherein said one or more circuits are operable to synchronize communication in a third communications protocol in the premises-based network, wherein the third communications protocol comprises a home phoneline networking alliance (HPNA) standard.

13. The system according to claim 11, wherein said one or more circuits are operable to synchronize communication in a third communications protocol in the premises-based network, wherein the third communications protocol comprises an IEEE 802.11x standard.

14. The system according to claim 11, wherein said one or more circuits are operable to synchronize communication in a third communications protocol in the premises-based network, wherein the third communications protocol comprises a non-public wireless network protocol.

15. The system according to claim 11, wherein said extracted GTOD clock comprises one or more of: a GPS clock, a GLONASS clock, and a Galileo clock.

16. The system according to claim 11, wherein said one or more circuits are operable to receive a second signal for extracting a GTOD, wherein the second signal comprises a satellite signal.

17. The method according to claim 16, wherein said satellite signal conforms to a low Earth orbit satellite signal protocol.

18. The system according to claim 11, wherein said one or more circuits is operable to synchronize communication on the premises-based network by, at least in part, being operable to synchronize timing of signals transmitted by a network controller of the premises-based network, based at least in part on the extracted GTOD clock.

19. The system according to claim 18, wherein said network controller comprises wireless network and wired network capability.

20. A system for communication, the system comprising:
a multimedia over cable alliance (MoCA) network controller in a premises-based network, said MoCA network controller being operable to:
receive a DOCSIS signal;
extract a global time of day (GTOD) clock from said received DOCSIS signal; and
synchronize transmission of signals on a MoCA network by synchronizing orthogonal frequency division multiple access (OFDMA) channel frequency offsets to less than a part per million based, at least in part, on said extracted GTOD clock.

* * * * *